UNITED STATES PATENT OFFICE.

LOUIS BECKER, OF BALTIMORE, MARYLAND, ASSIGNOR TO JACKSON & TUCKER, OF SAME PLACE.

PROCESS OF MANUFACTURING FERRATED MALT LIQUORS.

SPECIFICATION forming part of Letters Patent No. 307,620, dated November 4, 1884.

Application filed March 11, 1884. (No specimens.)

*To all whom it may concern:*

Be it known that I, LOUIS BECKER, a citizen of the United States, residing at Baltimore city, in the State of Maryland, have invented new and useful Improvements in Processes of Manufacturing Ferrated Malt Liquors, of which the following is a specification.

My invention relates to the process of manufacturing ferrated fermented malt liquors; and its object is to purify and cleanse the wort in the process of brewing, and to then produce from the same a new ferrated malt liquor. I accomplish this by means of ferration or adding iron in any form; but preferably using certain soluble vegetable salts of iron, adding them to the malt beverage or liquor at various stages of the process, using and employing the same apparatus and method of brewing that are used in manufacturing lager-beer, ale, and porter of commerce. This consists in the following operations: mashing, boiling, cooling, fermenting, and cleansing. During the cooling operation the iron is added to remove the tannin contained in the wort, or, in other words, to detannate the liquor during and after fermentation; and while cleansing, iron is again added to remove yeast-cells and other objectionable or foreign substances; and when the beer is finished, iron is dissolved in the beverage for medicinal purposes.

In carrying my invention into effect I use the same apparatus and method of brewing that are employed by brewers in the manufacture of malt liquors, and the following ingredients are used for each thirty-six-gallon barrel of the beverage, viz: malt, three bushels; hops, one and one-half pound; iron salts, sufficient quantity, with water enough to make thirty-six gallons. By "iron salts" I mean the vegetable salts of iron—such as the citrate, tartrate, and malate. The malt is first boiled with a sufficient quantity of water to extract its virtues, and the decoction is then strained and infused with the hops for the purpose of impregnating the same with their flavor and bitter taste. It is then run into a trough or chamber to cool down to a suitable temperature for fermentation. At this stage of the process the cooling wort is treated with a solution consisting of three hundred grains of tartrate of iron in a half-gallon of water, which is intimately stirred and mixed with the wort. The wort thereupon assumes an inky-black color, which is due to the combination of the iron with the tannin contained in the hops, and which forms therewith a chemical compound—tannate of iron—which finally deposits at the bottom in the form of an insoluble powder. This operation I have termed "detannating." The wort is then filtered from the sediment and run into a fermenting-vat, yeast is added, and fermentation is allowed to proceed in the usual way. When this fermentation is so far advanced that a thick brown yeasty appearance is given to the surface, and it shows an inclination to fall, the dark scum is skimmed off, and about one hundred and twenty grains of the tartrate or citrate of iron in scales (or any soluble vegetable salt of iron) are sprinkled evenly over the surface of the fermented liquor for every thirty-six gallons contained in the vat. This causes the deposition of objectionable and foreign substances to the bottom of the vat, and avoids the rank and disagreeable taste in beer, ale, and porter, which is called, commonly, "yeast-bitter." This treatment I have termed "ferric cleansing." The beverage is then fined in the usual manner, put into barrels, and aged in subterranean vaults, just as the lager-beer of commerce. To additionally ferrate the beer to produce the beverage, the following formula is added to every barrel before it is sent out for consumption, viz: Take of extract malate of iron twelve grams; tartrate of iron, four grams; citrate of iron, eight grams, and dissolve in water, (one hundred centimeters.) Fermented malt liquors so treated—that is to say, detannated and cleansed with iron as described—acquire the property of retaining the virtues of the iron as a beverage for a long time before decaying or undergoing acetous fermentation.

Beer, ale, and porter, as now prepared and brewed, contain substances that cause them to decay and putrify, and unfit them for the purpose of storing and exportation, or for any other purpose than for immediate use, unless the beverages have been subjected to a process of steaming, which causes them to become flat and insipid. The process of ferration removes those objectionable substances, and dispenses with the expensive steaming, while the beverage retains its sparkling quality under any ordinary temperature, and will "keep" for a long time. It also renders the beverage an excellent vehicle for the medicinal administration of iron, it being well understood that iron may not be added to the malt beverages of commerce without destroying their taste and value. In fine, I render it possible to produce an unobjectionable ferrated malt liquor. I do this, as above described, by detannating the wort in the process of manufacture by iron and afterward, as described, medicinally ferrate the manufactured liquor so detannated and cleansed.

I claim—

1. The process of detannating malt liquors which consists in ferrating the wort while cooling to eliminate and deposit the tannin as an insoluble tannate of iron in the bottom of the cooling-chamber, and in filtering the wort therefrom, substantially as herein described.

2. The process of ferrating malt liquors which consists in ferrating the fermenting wort in the manufacture of malt liquors by sprinkling a soluble salt of iron thereon, in order to cause the deposit of yeast-cells and other foreign matters to the bottom, whereby to purify the malt liquor from decay and acetous fermentation, substantially as described.

3. The art of medicinally ferrating malt liquors which consists in first detannating the wort and cleansing the liquor in the process of manufacture, and then adding ferric vegetable salts for medication, substantially as and in the manner set forth.

In testimony whereof I have hereunto set my hand in the presence of two subscribing witnesses.

LOUIS BECKER.

Witnesses:
  LUTIE NORRIS,
  ELLA JOHNSON.